(12) United States Patent
Correia et al.

(10) Patent No.: US 9,517,710 B2
(45) Date of Patent: Dec. 13, 2016

(54) MOTOR VEHICLE COMPRISING A SEAT HAVING A DETACHABLE SITTING PART FOR FREEING ACCESS TO A RECESS IN THE INTERNAL STRUCTURE OF THE VEHICLE

(71) Applicant: RENAULT s.a.s., Boulogne Billancourt (FR)

(72) Inventors: Miguel Correia, Pierres (FR); Guillaume Brotonne, Septeuil (FR); David Lancelot, Gemigny (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 14/771,972

(22) PCT Filed: Feb. 17, 2014

(86) PCT No.: PCT/FR2014/050320
§ 371 (c)(1),
(2) Date: Sep. 1, 2015

(87) PCT Pub. No.: WO2014/131966
PCT Pub. Date: Sep. 4, 2014

(65) Prior Publication Data
US 2016/0009208 A1 Jan. 14, 2016

(30) Foreign Application Priority Data
Mar. 1, 2013 (FR) ...................................... 13 51863

(51) Int. Cl.
*B60N 2/02* (2006.01)
*B60N 2/68* (2006.01)
(Continued)

(52) U.S. Cl.
CPC ............... *B60N 2/682* (2013.01); *B60N 2/005* (2013.01); *B60N 2/015* (2013.01); *B60N 2/686* (2013.01);
(Continued)

(58) Field of Classification Search
CPC ................. B60N 2/002; B60N 2/42745; H01L 2224/2919; A47C 7/14; A47C 7/405; A47C 1/03255; A47C 1/03272; A47C 1/03294; B60R 21/01516; B60R 22/02
(Continued)

(56) References Cited

U.S. PATENT DOCUMENTS 1,454,618 A * 5/1923 Banks ..................... B60R 15/02
296/24.3
6,102,463 A * 8/2000 Swanson .............. B60N 2/3013
296/37.15
(Continued)

FOREIGN PATENT DOCUMENTS

DE 102 38 888 3/2004
DE 10 2009 048 260 7/2010
(Continued)

OTHER PUBLICATIONS

French Search Report Issued Nov. 20, 2013 in French Patent Application No. 1351863 Filed Mar. 1, 2013.
(Continued)

*Primary Examiner* — Kiran B Patel
(74) *Attorney, Agent, or Firm* — Oblon, McClelland, Maier & Neustadt, L.L.P.

(57) ABSTRACT

A motor vehicle includes a floor, an internal structure delimiting side panels of a passenger compartment of the motor vehicle, and a seat including a back part and a sitting part. The sitting part of the seat is detachable so that the
(Continued)

Figure 1:
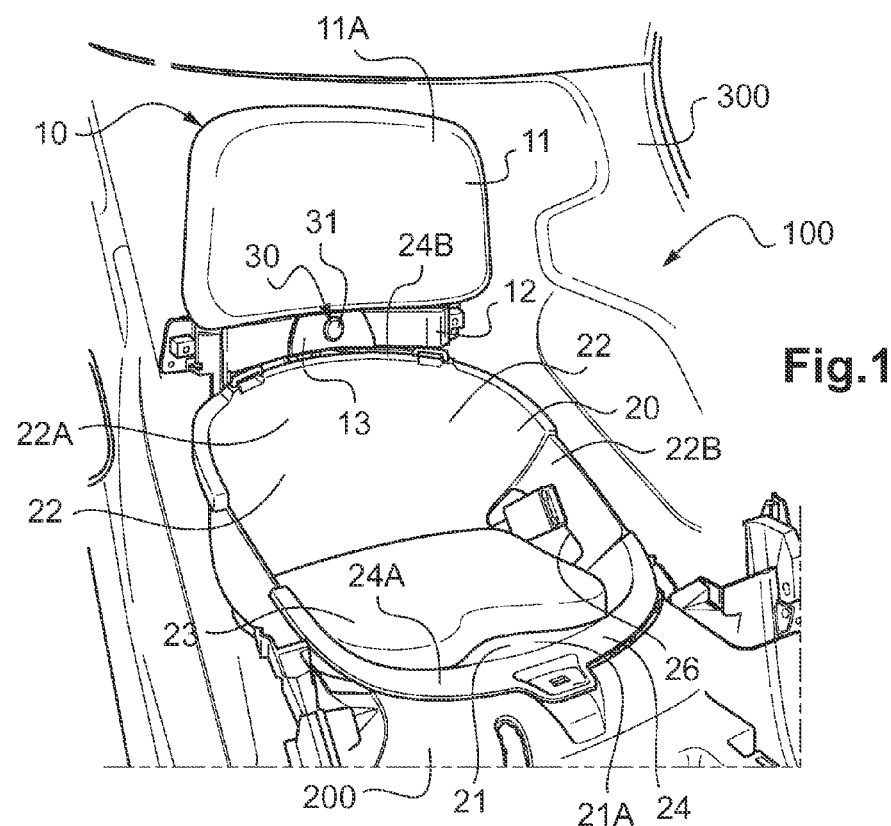

sitting part can be entirely separated from the floor and from the internal structure of the vehicle to free access to a first recess in the internal structure of the motor vehicle.

9 Claims, 6 Drawing Sheets

(51) Int. Cl.
    *B60N 2/005* (2006.01)
    *B60N 2/015* (2006.01)
    *B60R 7/04* (2006.01)

(52) U.S. Cl.
    CPC ......... *B60R 7/043* (2013.01); *B60N 2002/684* (2013.01)

(58) Field of Classification Search
    USPC .......................................................... 296/65
    See application file for complete search history.

(56) References Cited

U.S. PATENT DOCUMENTS

| | | | | |
|---|---|---|---|---|
| 6,460,922 | B1* | 10/2002 | Demick | B60N 2/3034 296/65.11 |
| 6,488,327 | B1 | 12/2002 | Pearse et al. | |
| 7,029,421 | B2 | 4/2006 | Henneken et al. | |
| 8,016,338 | B2* | 9/2011 | Nakamura | B60R 7/043 296/37.14 |
| 2007/0029832 | A1* | 2/2007 | Prugarewicz | B60N 2/3011 296/65.09 |
| 2008/0030039 | A1* | 2/2008 | Sturt | B60N 2/3079 296/63 |
| 2008/0272630 | A1* | 11/2008 | Sturt | B60N 2/64 297/188.07 |
| 2009/0051188 | A1* | 2/2009 | Foussianes | B60N 2/002 296/65.01 |
| 2009/0102222 | A1* | 4/2009 | Kato | B60N 2/3043 296/65.08 |
| 2010/0133870 | A1* | 6/2010 | Kan | B60N 2/01516 296/65.18 |
| 2014/0312671 | A1* | 10/2014 | Kawamoto | B60N 2/36 297/354.1 |
| 2016/0016487 | A1* | 1/2016 | Correia | B60N 2/643 297/94 |
| 2016/0016491 | A1* | 1/2016 | Correia | B60N 2/682 296/64 |
| 2016/0016497 | A1* | 1/2016 | Correia | B60N 2/005 297/440.15 |

FOREIGN PATENT DOCUMENTS

| | | |
|---|---|---|
| DE | 10 2009 058 611 | 6/2011 |
| WO | 02 097308 | 12/2002 |
| WO | 2010 026729 | 3/2010 |

OTHER PUBLICATIONS

International Search Report issued May 9, 2014 in PCT/FR2014/050320 Filed Feb. 17, 2014.

* cited by examiner

MOTOR VEHICLE COMPRISING A SEAT HAVING A DETACHABLE SITTING PART FOR FREEING ACCESS TO A RECESS IN THE INTERNAL STRUCTURE OF THE VEHICLE

TECHNICAL FIELD TO WHICH THE INVENTION RELATES

The present invention relates to a motor vehicle comprising a floor, an internal structure delimiting the side panels of the passenger compartment, and a seat comprising a back part and a sitting part.

PRIOR ART

A motor vehicle such as that described in the introduction is known, notably from the document FR2950005.

This vehicle comprises a seat having a sitting part which can be turned over. This sitting part can be placed either in a first sitting position in which it is adapted to receive a passenger, or in a second, turned-over position in which it closes a housing delimited between the vehicle floor and this turned-over sitting part.

Thus this seat makes it possible to benefit from a storage space in the housing delimited by the sitting part in its turned-over position, while no passenger is sitting on the seat.

However, when the seat is occupied by a passenger, or when the seat is used in a motor vehicle having a very small interior space, this storage space may prove to be inadequate.

OBJECT OF THE INVENTION

In order to overcome the aforesaid drawback of the prior art, the present invention proposes a motor vehicle that can provide increased storage space, even when the seats are occupied by passengers.

More particularly, the invention proposes a seat as described in the introduction, wherein said sitting part of the seat is detachable, so that it can be entirely separated from the floor and from the internal structure of the vehicle to free access to a first recess in the internal structure of this vehicle.

Thus, the back part can be withdrawn from the rest of the seat so as to free access to a recess in the internal structure of the vehicle in which certain objects can be stored. This recess is located in the internal structure delimiting the side panels of the passenger compartment. It is, for example, a recess located behind the seat. More precisely, it is a recess located behind the sitting part and/or behind the back part when the seat is arranged in a conventional manner in the vehicle, so that the passenger sits facing the road.

Other non-limiting and advantageous characteristics of the motor vehicle according to the invention are as follows:
  said back part is detachable, so that it can be entirely separated from the internal structure of the vehicle to free access to a second recess in said internal structure;
  said floor comprises means for mounting the sitting part, and said internal structure comprises means for receiving the back part;
  common locking means are provided and are capable of simultaneously preventing the movement of the back part and the sitting part;
  at least some of said locking means belong to the back part, so that the back part is capable of locking the sitting part in its mounted position on the vehicle;
  said locking means comprise a locking element belonging to the back part and capable of being moved between a locking position and a release position, and a housing belonging to said sitting part, capable of receiving this locking element in its locking position, this locking element and this housing being arranged in such a way that any movement of the back and sitting parts is prevented when the locking element is in its locking position;
  said sitting part can be turned over, between a sitting position in which it is adapted to receive a passenger and a turned-over position in which it closes a housing, and said locking means are adapted to prevent the movement of this sitting part in its two positions, namely the sitting position and the turned-over position;
  said floor comprises a third recess, located under the seat, facing the sitting part, the access to this recess being freed when said sitting part is detached from the rest of the seat; and
  said first and second recesses in the internal structure of the vehicle communicate with one another.

DETAILED DESCRIPTION OF AN EXEMPLARY EMBODIMENT

The following description, referring to the attached drawings which are provided by way of non-limiting example, will make the nature and application of the invention clear.

Figure 2:
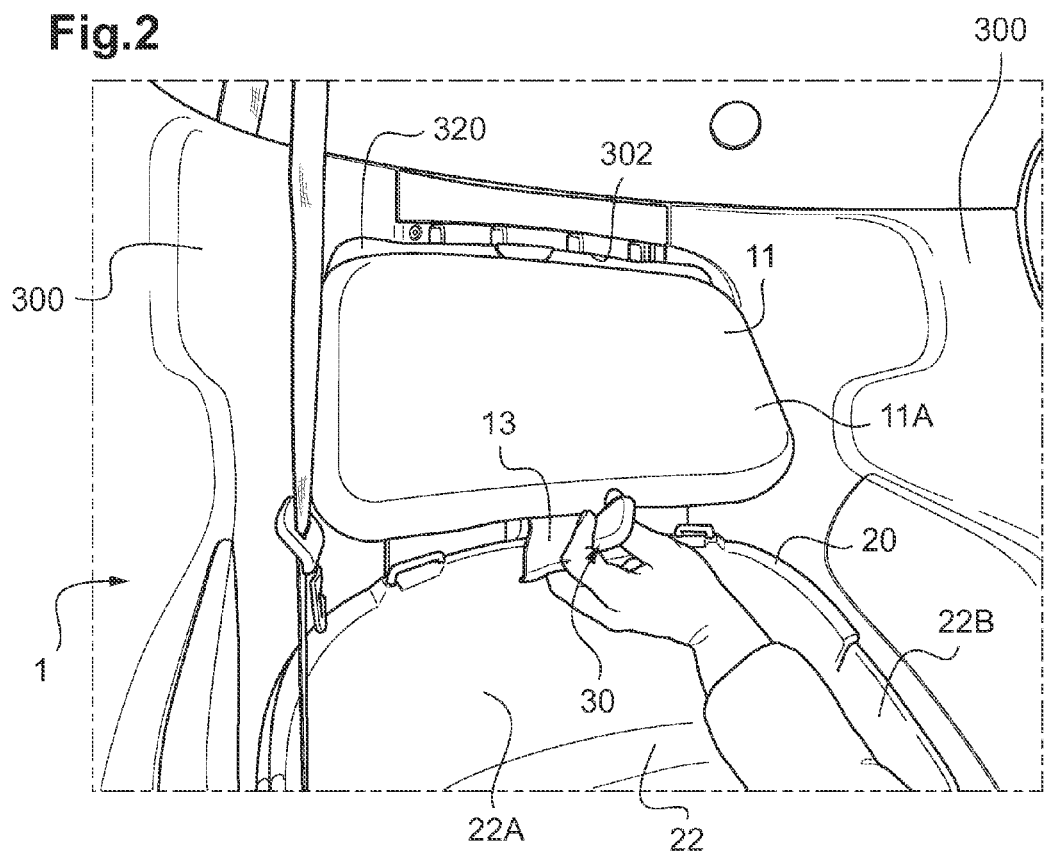
Figure 3:
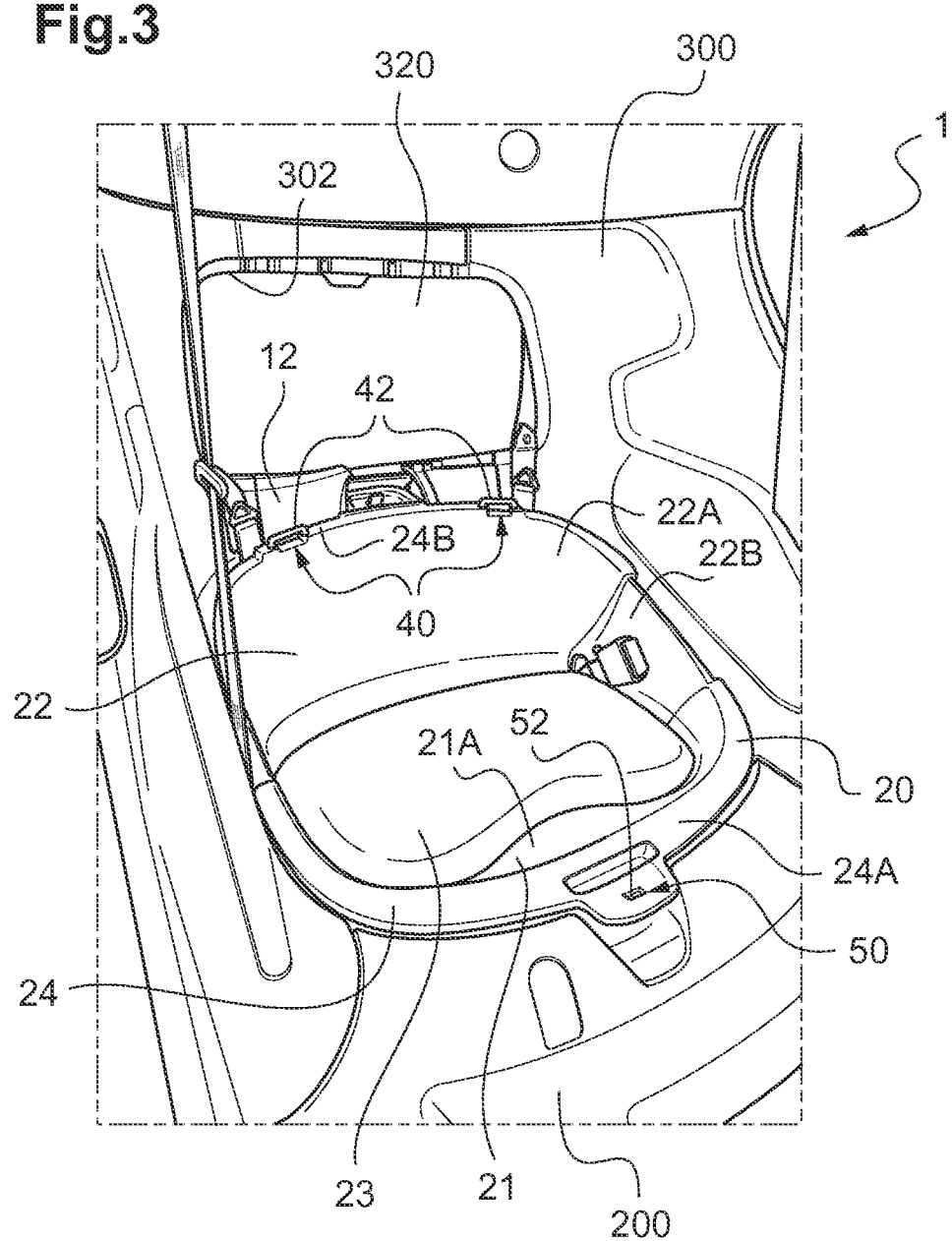
Figure 4:
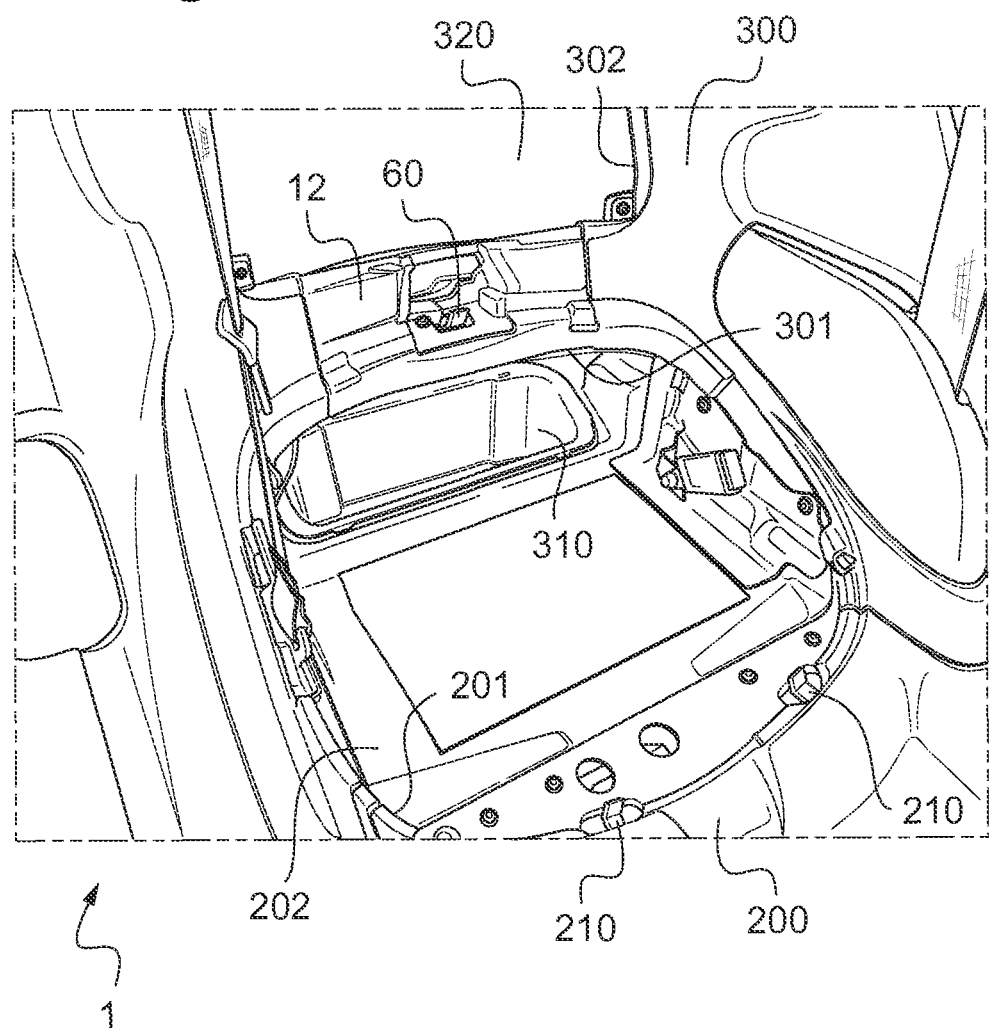
Figure 5:
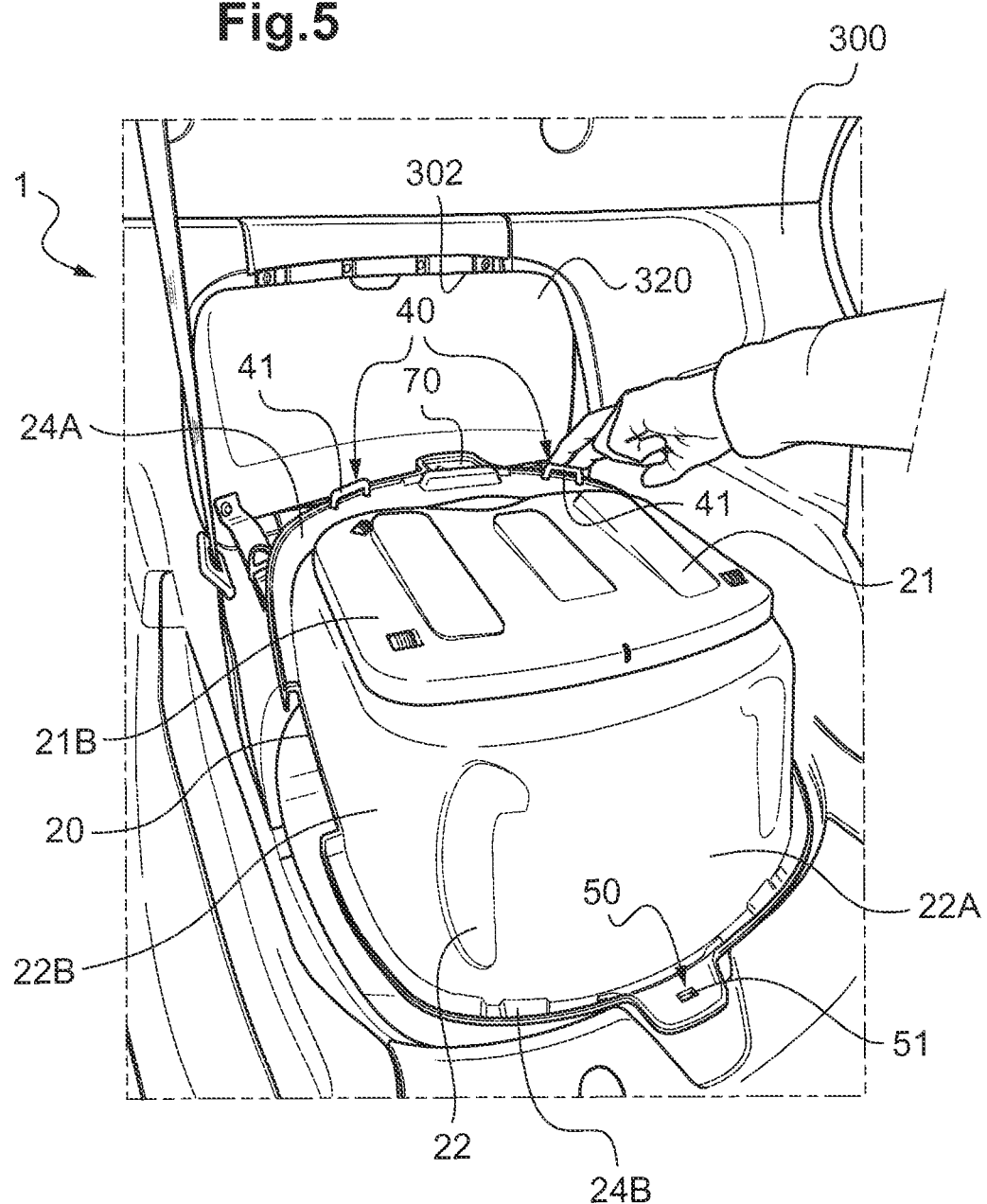
Figure 6:
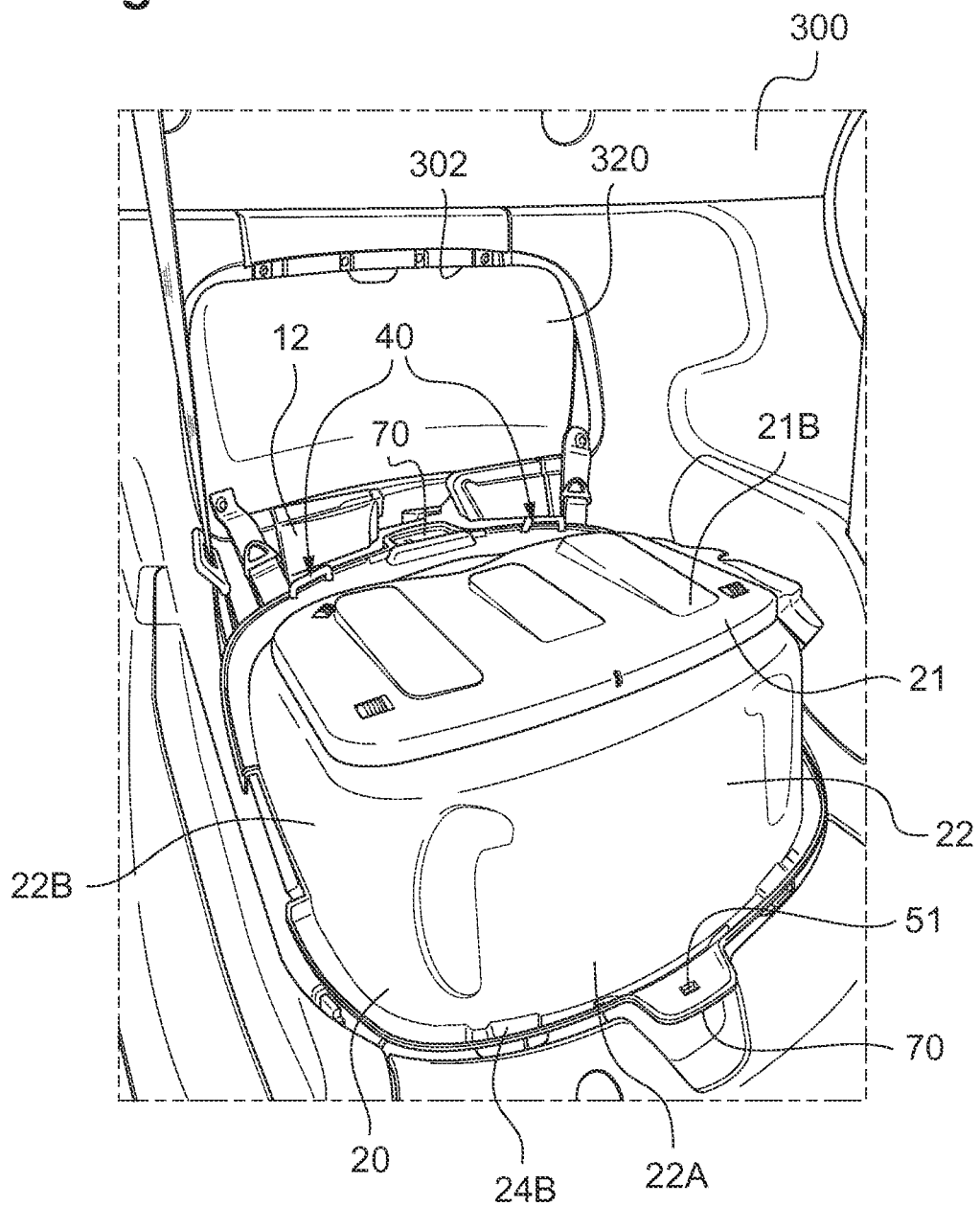
Figure 7:
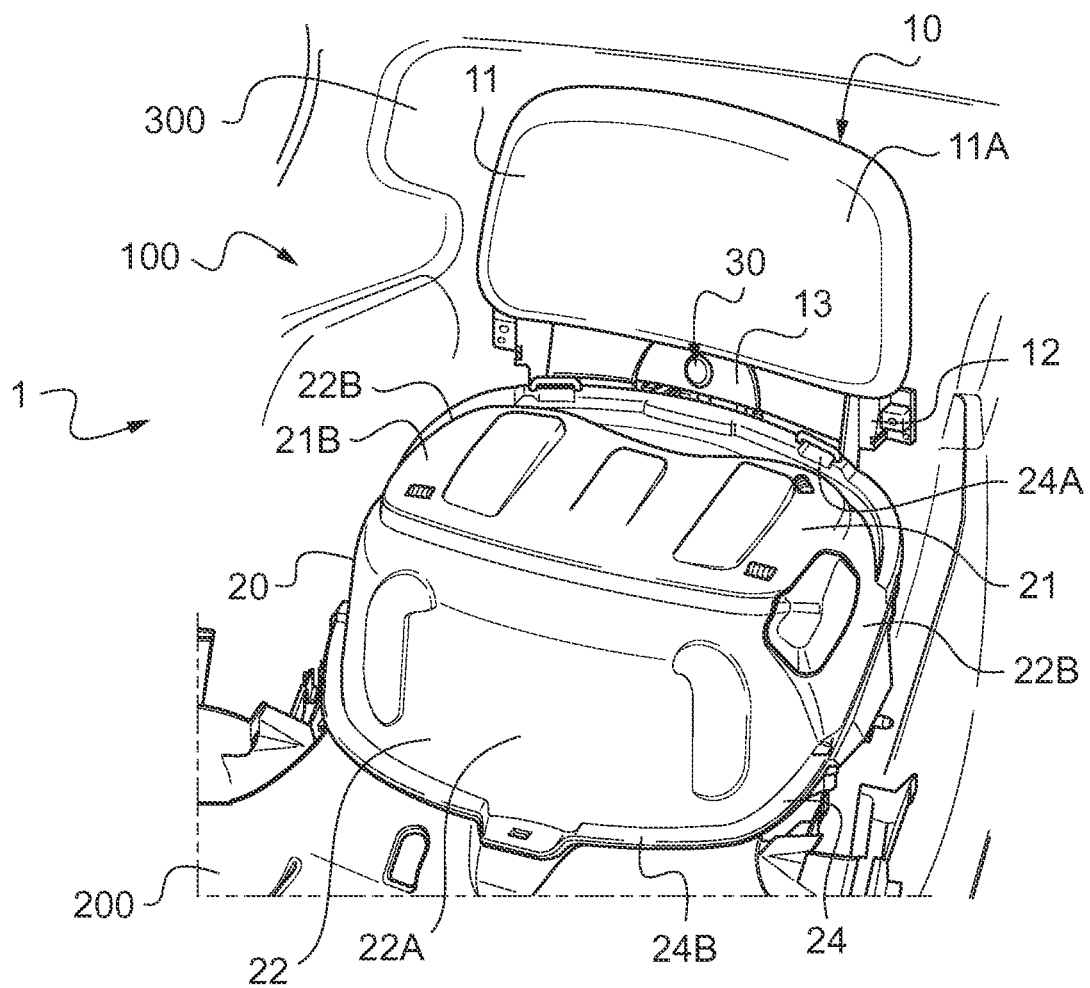

In the attached drawings:

FIG. 1 is a schematic perspective view of the motor vehicle according to the invention with a seat having a sitting part in the receiving position, FIG. 2 is a schematic perspective view of the back part of the seat of the motor vehicle of FIG. 1, during the removal of the seat from the internal structure of the vehicle and from the rest of the seat, FIG. 3 is a schematic perspective view of the motor vehicle of FIG. 1 in which the back part has been removed, FIG. 4 is a schematic perspective view of the motor vehicle of FIG. 1 in which the back part and the sitting part have been removed, FIG. 5 is a schematic view of the motor vehicle of FIG. 1 in which the sitting part is in the process of being turned over, FIG. 6 is a schematic view of the motor vehicle of FIG. 1 in which the back part has been removed and the sitting part of the seat has been turned over, and FIG. 7 is a schematic view of the motor vehicle of FIG. 1 in which the back part is in the mounted position on the seat and the sitting part has been turned over.

By way of preamble, it should be noted that the terms "front" and "rear" on the one hand, and the terms "upper" and "lower" on the other hand, will be used in the description with reference to the conventional orientation of a seat in a motor vehicle, in which the passenger seated on the seat faces the road in forward travel.

FIGS. 1 to 7 show a partial view of a motor vehicle 1 according to the invention, provided with a seat 100.

This seat 100 comprises a back part 10 and a sitting part 20.

The motor vehicle 1 comprises, notably, a floor 200 and an internal structure 300 delimiting the passenger compartment of the vehicle.

The floor 200 extends substantially parallel to the ground and forms the lower part of the passenger compartment of the vehicle.

The internal structure 300 delimits the side panels and the roof of the passenger compartment of the vehicle 1.

The internal structure 300 and the floor 200 of the vehicle 1 comprise, for example, a metal frame and a plastic covering.

The motor vehicle 1 also comprises, notably, wheels supporting the passenger compartment of the vehicle and an engine, for example an electric motor, adapted to cause its wheels to rotate in order to make the vehicle advance.

The seat 100 is mounted on the floor 200 and on the internal structure 300.

For this purpose, said floor 200 comprises means for mounting the sitting part 20, and said internal structure 300 comprises means for receiving the back part 10.

In a remarkable way, said sitting part 20 of the seat 100 is detachable, so that it can be entirely separated from the floor 200 and from the internal structure 300 of the motor vehicle 1 to free access to a first recess 310 in the internal structure 300 of this vehicle 1.

The term "detachable" denotes the quality of a part that can be separated and removed from its environment manually, without the use of tools.

Advantageously, said back part 10 also comprises, in this case, at least one upper detachable main part 11, which is adapted to be entirely separated from the rest of the seat 100, and a lower fixed part 12. The fixed part 12 of the back part 10 is fixed in a non-detachable way to the internal structure 300 of the passenger compartment of the vehicle, for example by screwing or by riveting.

The detachable main part 11 of the back part 10 is a part designed to receive the back of a passenger.

In the examples shown here, the sitting part 20 takes the form of a molded half-shell. It is made, for example, of plastic material.

In this case, this sitting part 20 comprises a sitting panel 21, bordered at least partially by a side panel 22.

In this case, this sitting part 20 is, more precisely, capable of being turned over, since it is adapted to be mounted on the floor 200 of the vehicle in two distinct positions, namely a first receiving position, shown in FIG. 1, in which the side panel 22 extends in a first direction at the rear of the sitting panel 21 and forms a part of the back part of the seat 100, and a second, turned-over position, shown in FIG. 7, in which the side panel 22 extends at the front of the sitting panel 21, in a second direction opposed to the first direction.

Thus, in the turned-over position, the sitting part 20 has been turned through 180 degrees around an axis globally parallel to the sitting panel 21 and to the back part 10.

In both of these positions, the sitting panel 21 of the sitting part 20 is designed to extend substantially horizontally in the motor vehicle.

The sitting panel 21 has an upper face 21A (FIGS. 1 to 3) oriented toward the passenger in the receiving position of the sitting part 20, and an opposed lower face 21B (FIGS. 5 to 7) oriented toward the floor 200 of the vehicle 1 in this receiving position. A seat cushion 23 is provided on the upper face 21A of the sitting panel 21 (FIGS. 1 and 3).

The sitting panel 21 has a generally rectangular shape, with highly rounded corners in the present case. In the present case, the side panel 22 borders this sitting panel 21 along the first three of its sides. Thus it has a central portion 22A running along a longitudinal side of the sitting panel 21 and two end portions 22B running along the lateral sides of the sitting panel 21.

The second longitudinal side of the sitting panel 21, not bordered by the side panel 22, is referred to below as the front side of the sitting panel 21.

The free edge of the side panel 22 and of the front side of the sitting panel 21 is surrounded by an edging 24 which extends toward the outside of the sitting part 20.

The part of this edging 24 which runs along the front side of the sitting panel 21 is referred to below as the front edging 24A of the sitting part 20. The part of this edging 24 which runs along the central portion 22A of the side panel 22 is referred to below as the rear edging 24B of the sitting part 20.

The side panel 22 rises from the upper face 21A of the sitting panel 21 and has a variable height relative to this sitting panel 21.

More precisely, the height of the side panel 22 is at its maximum in the central portion 22A bordering the part of the sitting panel 21 opposed to said fourth side of the sitting panel 21. It then decreases along the end portions 22B until it meets the sitting panel 21 at the front side of the sitting panel 21.

In the receiving position of the sitting part (FIG. 1), the central portion 22A of the side panel 22 extends in the continuation of the back part 10, between this back part 10 and the sitting panel 21 of the sitting part 20. This central portion 22A of the side panel 22 then forms, together with the back part 10, the back of the seat 100.

Evidently, the central portion 22A of the side panel 22 is then oriented toward the rear of the vehicle.

This central portion 22A of the side panel 22 of the sitting part 20 then at least partially blocks a first opening 301 in the internal structure 300 of the motor vehicle 1, located at the rear of the seat 100, behind this central portion 22A of the sitting part 20.

This first opening 301 gives onto a first recess 310 in the internal structure 300 of the vehicle.

The first recess 310 is therefore located behind the central portion 22A of the side panel 22 of the sitting part 20, that is to say behind the seat 100, in a low part of the seat back.

In this receiving position, the sitting panel 21 of the seat 100 extends generally in the continuation of the floor 200 of the vehicle. Thus it blocks an aperture 201 formed under the seat 100 in the floor 200.

This aperture 201 gives onto a recess 202 provided in the floor 200 of the vehicle 1 (FIG. 4).

The recess 202 in the floor 200 of the vehicle is therefore located under the sitting part 20, that is to say under the seat 100.

The front edging 24A of the sitting part 20 is then oriented toward the front of the vehicle.

In this receiving position, the sitting part 20 enables the user to sit on the seat cushion 23 provided on the upper face 21A of the sitting panel 21. The user's back rests against the central portion of the side panel 22 and the back part 10. His legs pass over the front edging 24A of the sitting part 20.

Separating the sitting part 20 of the seat 100 (FIG. 4) can thus free the access to said first recess 310 in the internal structure of the vehicle, and to said recess 202 in the floor 200.

In the turned-over position of the sitting part (FIGS. 6 and 7), the sitting panel 21 extends between the back part 10 and the side panel 22 of the sitting part 20.

The lower face 21B of the sitting panel 21 is oriented toward the user, and the upper face 21A of the sitting panel 21 is then oriented toward the floor 200 of the vehicle. Finally, the central portion 22A of the side panel 22 of the sitting part 20 is oriented toward the front of the vehicle.

In this turned-over position, the sitting panel 21 is elevated above the floor of the vehicle by the side panel 22. Consequently, the sitting part 20 delimits within itself, in this case, a housing in which the user can store his personal belongings, and which is closed in its upper part by the sitting part 20. This housing is even larger because it preferably overhangs the aforementioned aperture in the floor.

The sitting part 20 then forms a storage box.

For fixing the sitting part 20 of the seat 100 in the vehicle, the sitting part 20 comprises means 40 (FIGS. 3 and 5) for mounting it on the floor 200 of the vehicle in its two positions, namely the receiving position and the turned-over position.

These mounting means 40 are adapted to interact with complementary mounting means on the floor of the vehicle.

More precisely, the sitting part 20 comprises first mounting means 41 (FIG. 5) adapted to interact with the complementary mounting means 210 (FIG. 4) on the floor 200 in the receiving position, and second mounting means 42 (FIG. 3) adapted to interact with the same complementary mounting means on the floor 200 in the turned-over position.

More precisely, the floor of the vehicle according to the invention comprises, in this case, two mounting lugs, and each of the first 41 and second 42 means for mounting the sitting part 20 on the floor 200 of the vehicle 1 comprises two receiving slots adapted to allow these mounting lugs to pass through them.

Each of the slots for receiving the means 40 for mounting the sitting part 20 is delimited by an arch springing from the front edging 24A or rear edging 24B of the sitting part 20 (FIGS. 3 and 5).

In this case, the mounting means are of the pivotable type, because the sitting part 20 can pivot about the attachment lugs on the floor of the vehicle.

The sitting part 20 also comprises attachment means 50 adapted to interact with complementary attachment means 60 of the back part 10 in the two positions, namely the receiving position and the turned-over position, so as to attach the sitting part 20 to the back part 10.

More precisely, it thus comprises first attachment means 51 (FIG. 5) adapted to interact with the complementary attachment means 60 of the back part 10 in the receiving position, and second mounting means 52 (FIG. 3) adapted to interact with the same complementary attachment means 60 of the back part 10 in the turned-over position.

The complementary attachment means 60 (FIG. 4) of the back part 10 comprise, for example, a single attachment lug which projects from the back part 10.

More precisely, in this case this attachment lug is fitted onto the fixed part 12 of the back part 10. This fixed part 12 of the back part 10 is placed between the sitting part 20 and the movable part 11 of the back part 10. The fixed part 12 of the back part 10 comprises a metal frame fixed to the structure of the passenger compartment of the vehicle, and a cover molded from plastic material.

This cover of plastic material comprises a ledge 15 on which the front edging 24A or rear edging 24B of the sitting part 20 bears.

Each of the first 51 (FIG. 5) and second 52 (FIG. 3) attachment means of the sitting part 20 comprises an aperture through which said attachment lug can pass in the corresponding receiving or turned-over position of the sitting part 20.

The size of each aperture 51, 52 is such that, in order to disengage the sitting part 20 from the attachment lug 61, the sitting part 20 must be made to move with a special pivoting movement about an axis passing through the mounting lugs on the floor 200.

The mounting lugs, in this case, are not parallel to one another, but the clearance between each mounting lug and the corresponding arch allows this pivoting movement.

The back part 10 extends substantially vertically in the motor vehicle 1 according to the invention.

The detachable part 11 of the back part 10 has, in this case, a generally rectangular shape with rounded corners, with two opposed longitudinal edges linked by two lateral edges. This detachable main part 11 comprises a metal frame 11B covered in front by a textile cover 11A (FIGS. 1 and 2).

The detachable main part 11 of the back part 10 comprises a tab 13 (FIG. 2) which extends substantially in the same plane as the front face of the detachable main part 11, from a first of its longitudinal edges. This first longitudinal edge is designed to interact with the fixed part 12 of the back part 10 when the detachable main part 11 is mounted on the seat 100.

It also comprises, on the one hand, means of interaction with complementary interaction means of the fixed part 12 of this back part 10 for retaining this detachable main part 11 on this fixed part 12, and, on the other hand, means of retention on the internal structure 300 of the passenger compartment of the vehicle.

More precisely, in this case the fixed part 12 of the back part 10 comprises a rear transverse bar which extends substantially horizontally at the rear of this fixed part 12 of the back part 10.

The means for the interaction of the detachable main part 11 with the fixed part 12 comprise, for example, a mounting lug which extends at the rear of the tab 13, substantially parallel to the rear face of the detachable main part 11 of the back part 10, and which can be moved between a fixing position in which it interacts with said transverse bar to retain the detachable main part 11 on the fixed part 12 and a release position in which the detachable main part can be removed from the fixed part 12.

The internal structure 300 of the motor vehicle comprises, in this case, a second opening 302 (FIG. 4) giving onto a second recess 320 in the internal structure of the vehicle. This second recess 320 is located at the rear of the back part 10, that is to say behind the seat 100, in a high part of the seat back. Access to this second recess 320 is prevented by the detachable main part 11 of the back part 10 when the latter is mounted on the seat 100, and is freed when the detachable main part 11 of said back part 10 is separated from the rest of the seat 100 and from the internal structure 300 of the vehicle.

The peripheral edge of the second opening 302 in the internal structure 300 of the vehicle is adapted to interact with the lateral edges and the second longitudinal edge of the detachable part 11 of the back part 10 to hold the latter in place. This peripheral edge of the second opening 203 therefore forms means for receiving the detachable main part 11 of the back part 10.

Additionally, means for attaching this back part to the internal structure 300 are provided at the rear of this detachable main part of the back part, for example in the form of a hook adapted to interact with a tooth of the internal structure 300 which projects into the opening receiving the main part of the back part in order to retain the latter on the internal structure when it is in place on the seat 100.

Finally, common locking means 30 are provided, and are adapted to simultaneously prevent the movement of the back part 10 and of the sitting part 20.

At least a part of said locking means 30 belongs to the back part 10, so that the back part 10 is adapted to lock the sitting part 20 in its mounted position on the vehicle 1.

More precisely, in this case it is the detachable main part 11 of the back part 10 that comprises said locking means 30 which simultaneously prevent the movement of this detachable main part 11 of the back part and that of the sitting part 20.

Advantageously, the locking means 30 are, in this case, adapted to lock the sitting part 20 in its two positions, namely its receiving and turned-over positions.

These locking means 30 are, for example, key-operated locking means. In this case they comprise a single lock belonging to the back part 10 and means of interaction with this lock in the two positions, namely the receiving and turned-over positions, of the sitting part 20.

These means of interaction comprise, for example, for each of the two positions of the sitting part 20, a housing adapted to receive a locking element of the lock 31, thereby blocking any movement of the sitting part.

In this case, this housing is formed by a cavity 70 (FIG. 6) provided in the front edging 24A and the rear edging 24B of the sitting part 20.

The locking element is formed by the bolt of the lock.

In this case, the lock 31 comprises a barrel, one face of which is accessible on the front face of the detachable main part 11 of the back part 10.

This barrel is held at the level of the tab 13 of the detachable main part 11 of the back part 10.

Advantageously, in this case, the attachment lug of the detachable main part 11 on the fixed part 12 of the back part 10 is carried by the barrel of the lock 31. This attachment lug and the bolt of the lock pivot simultaneously.

Method

The use of the seat according to the invention will now be described in greater detail.

The sitting part 20 is initially considered to be in its receiving position, shown in FIG. 1.

When the user wishes to access the first recess 310 in the internal structure 300 of the motor vehicle 1 in order to store objects therein or retrieve objects therefrom, he separates the sitting part 20 from the seat 100.

At this point, he may also advantageously turn over the sitting part 20 of the seat 100 in order to place other objects in the storage box formed by the turned-over sitting part 20.

For this purpose, he performs the following steps.

First of all, the user inserts the appropriate key into the barrel of the lock 31, which is accessible on the front face of the back part 10.

He thereby frees the detachable main part 11 from its interaction with the fixed part 12 of the back part 10 and simultaneously unlocks the sitting part 20 by turning the key in the lock 31 (FIG. 2).

Finally, in order to allow the sitting part 20 to pivot, the user separates the detachable part 11 of the back part 10 from its fixed part 12 (FIGS. 2 and 3).

By doing this, the user has already freed the access to the second recess 320 in the internal structure 300 of the vehicle 1, located behind the back part 10 (FIG. 3).

The sitting part 20 continues to be held on the floor and on the back part 10 by the interaction of the mounting means 40 and attachment means 50 of the sitting part 20 with the complementary means described above. However, the sitting part 20 can then pivot on the floor 200 because of its mounting means 40.

The user causes the sitting part 20 to pivot relative to the floor 200 of the vehicle about a pivot axis located near the front edging 24A of this sitting part 20. When this is done, the attachment means 50 of the sitting part 20 are freed from their interaction with the complementary attachment means 60 of the back part 20.

The user raises the sitting part 20 so as to free the mounting means 40 of the sitting part 20 from their interaction with the complementary mounting means of the floor 200 of the vehicle.

The sitting part 20 is then entirely separated from the rest of the seat 100, from the internal structure 300, and from the floor 200 of the vehicle 1.

Access to the first recess 310 in the internal structure 300 of the vehicle, located at the rear of the sitting part 20, behind the central portion 22A of its side panel 22, is freed.

Then, if the user needs no additional storage space, or if a passenger is to sit on the seat 100, the user refits the sitting part 20 of the seat 100 in its receiving position. For this purpose, he performs the steps described above, in the reverse order.

Conversely, if the user wishes to benefit from an additional storage space, he can decide to re-attach the sitting part in its turned-over position on the seat 100.

For this purpose, he turns over the sitting part 20 so as to position its sitting panel 21 between the back part 10 and its side panel 22.

He re-establishes the interaction of the mounting means of the sitting part 20 with the complementary mounting means of the floor 200 of the vehicle.

He then causes said sitting part 20 to pivot until the means 50 for attaching the sitting part 20 to the back part 10 of the seat 100 interact with the complementary attachment means 60 of the back part 10 (FIGS. 5 and 6).

The user then refits the detachable main part 11 of the back part 10 on its fixed part 12 (FIGS. 6 and 7).

Finally, he locks said locking means 30. When this is done, the attachment lug of the detachable main part 11 is attached behind the transverse bar of the fixed part 12 of the back part 10, and the lock bolt is housed in the complementary housing of the sitting part 20.

The sitting part 20 is then in the locked, turned-over position of FIG. 7.

All access to the recesses in the internal structure and in the floor is then prevented in a secure way.

The key-operated locking means described here are locking means comprising a mechanical key adapted to cause the movement of the lock bolt.

However, it would be feasible for the key to be a digital key transmitted to electrical means of moving the lock bolt.

Additionally, there is a feasible case here in which the internal structure 300 of the motor vehicle comprises a first and a second distinct recess, that is to say recesses forming two separate storage spaces. In a variant, it would evidently be feasible for the first and second recess to communicate with one another and to form only a single storage space extending at the rear of the seat 100.

The invention claimed is:

1. A motor vehicle, comprising:
   a floor;
   an internal structure delimiting side panels of a passenger compartment of the vehicle; and
   a seat comprising a back part and a sitting part,
   wherein said sitting part of the seat is detachable so that the sitting part can be entirely separated from the floor and from the internal structure of the vehicle to free access to a first recess in the internal structure of the vehicle.

2. The motor vehicle as claimed in claim 1, wherein said back part is detachable so that said back part can be entirely separated from the internal structure of the vehicle to free access to a second recess in said internal structure.

3. The motor vehicle as claimed in claim 1, wherein said floor comprises means for mounting the sitting part, and said internal structure comprises means for receiving the back part.

4. The motor vehicle as claimed in claim 1, further comprising common locking means adapted to simultaneously prevent the movement of the back part and of the sitting part.

5. The motor vehicle as claimed in claim 4, wherein at least a part of said locking means belongs to the back part so that the back part is adapted to lock the sitting part in a mounted position on the vehicle.

6. The motor vehicle as claimed in claim 4, wherein said locking means comprise:
 a locking element belonging to the back part and configured to be moved between a locking position and a release position; and
 a housing belonging to said sitting part and configured to receive the locking element in the locking position, the locking element and the housing being arranged such that any movement of the back part and the sitting part is prevented when the locking element is in the locking position.

7. The motor vehicle as claimed in claim 1, wherein said sitting part can be turned over, between a sitting position in which the sitting part is adapted to receive a passenger and a turned-over position in which the sitting part forms a housing in an interior of the sitting part, the motor vehicle further comprising locking means adapted to prevent movement of the sitting part in the sitting position and the turned-over position.

8. The motor vehicle as claimed in claim 1, wherein said floor comprises a third recess located under the seat and facing the sitting part, access to the third recess being freed when said sitting part is detached from the rest of the seat.

9. The motor vehicle as claimed in claim 2, wherein said first recess and said second recess in the internal structure of the vehicle communicate with one another.

* * * * *